United States Patent [19]
Garvie

[11] Patent Number: 5,296,420
[45] Date of Patent: Mar. 22, 1994

[54] COMPOSITE REFRACTORY MATERIALS

[75] Inventor: Ronald C. Garvie, Beaumaris, Australia, Gudrun Heidi Garvie, executrix

[73] Assignee: Commonwealth Scientific & Industrial Research Organization, Campbell, Australia

[21] Appl. No.: 892,728

[22] Filed: May 29, 1992

Related U.S. Application Data

[63] Continuation of Ser. No. 513,709, Apr. 25, 1990, which is a continuation-in-part of Ser. No. 328,359, Apr. 14, 1989, abandoned.

[51] Int. Cl.$^5$ .............................................. C04B 35/48
[52] U.S. Cl. .................................................. 501/105
[58] Field of Search ............... 501/102, 105, 104, 127, 501/153, 134

[56] References Cited

U.S. PATENT DOCUMENTS

| | | | |
|---|---|---|---|
| 3,992,213 | 11/1976 | Desouches et al. | 501/105 |
| 4,298,385 | 11/1981 | Claussen et al. | 501/105 |
| 4,322,249 | 3/1982 | Claussen et al. | 501/105 |
| 4,421,861 | 12/1983 | Claussen et al. | 501/105 |
| 4,571,331 | 2/1986 | Endou et al. | 501/88 |
| 4,666,467 | 3/1987 | Matsumoto et al. | 501/104 |
| 4,804,644 | 2/1989 | Anseau et al. | 501/105 |
| 4,873,064 | 10/1989 | Kato | 501/104 |
| 4,929,574 | 5/1990 | Iltis et al. | 501/137 |

*Primary Examiner*—Mark L. Bell
*Assistant Examiner*—A. Wright
*Attorney, Agent, or Firm*—Sughrue, Mion, Zinn, Macpeak & Seas

[57] ABSTRACT

A relatively dense composite refractory material which has reasonable strength and good thermal shock resistance comprises an alumina matrix material within which are dispersed particles of polycrystalline zirconia comprises from 1.0 to 40 percent by volume of the composite material. Each particle of zirconia is an agglomerate of microcrystals which are strongly bonded together. Due to the agglomerates of the bonding together of the microcrystals at their grain boundaries. The microcrystals contain no matrix material within their agglomerates, and exhibit strong thermal expansion anisotropy. They have a size such that cracks do not form spontaneously within the agglomerates during cooling from about 1600° C. to room temperature. Typically the agglomerates have a mean diameter of from 10 to 15 micrometers, while the average diameter of the microcrystals in an agglomerate is from 1 to 2 micrometers.

10 Claims, 2 Drawing Sheets

5,296,420

COMPOSITE REFRACTORY MATERIALS

This is a continuation of Application Ser. No. 07/513,709, filed Apr. 25, 1990, now abandoned, which is a continuation-in-part of application Ser. No. 07/328,359, filed Apr. 14, 1989, now abandoned.

TECHNICAL FIELD

This invention concerns refractories. More particularly, it concerns composite refractory in which have been dispersed within a matrix of a refractory material to produce a composite refractory material that exhibits good thermal shock resistance, reasonably high mechanical strength and good resistance to corrosion.

BACKGROUND TO THE INVENTION

It is well known that brittle materials cannot be simultaneously dense (which is synonymous with corrosion resistance) and thermal shock resistant. For example, if samples of a dense alumina refractory are heated in a furnace to progressively higher temperatures and then quenched in water to room temperature, and the mechanical strength of the quenched samples is measured, it will be found that at a critical temperature (which varies according to the size of the sample and the conditions under which the experiment is conducted), there is a sudden and significant reduction in the strength retained by the sample after the quenching. In one reported instance, experiments with samples of a dense alumina showed that:

(a) after quenching the sample following heating in a furnace to temperatures of up to (typically) 150° C., the modulus of rupture of the quenched sample remains high (about 230 MPa in a test run conducted by the present inventor); that is, no damage to the sample has resulted from the quenching;

(b) with samples quenched after heating to a furnace temperature of about 150° C., the modulus of rupture of the quenched sample drops dramatically (to about 60 MPa in the test run), showing that the thermal stresses generated during the quench are sufficient to activate pre-existing surface flaws (cracks) in the alumina refractory, so that these flaws propagate catastrophically through the material, causing the sudden loss of strength of the quenched sample; and (c) when the sample is quenched from temperatures in excess of about 240 °the strength of the quenched samples falls approximately exponentially, the modulus of rupture reaching a value of about 19 MPa in the test run when the furnace temperature was 400° C.

To overcome the problem of unstable crack propagation in the quenching process, the traditional approach has been to introduce porosity into the refractory material. This reduction in density also reduces the low temperature strength of the refractory but the effect of quenching from higher temperatures is less dramatic. For example, samples of the same alumina material that has been described above which have a 5 percent porosity had an inherent low temperature strength of about half that of the dense material, the low temperature modulus of rupture being approximately 103 MPa. At the critical temperature of 150° C., quenching reduced the strength of the material with 5 percent porosity, but the modulus of rupture of the quenched material was about 87 MPa. Quenching samples of this material from a temperature of 400° C. produced samples having a modulus of rupture of about 70 MPa.

A refractory brick which is high in alumina content and has a porosity in the range from 15 percent to 25 percent completely solves the thermal shock problem. The modulus of rupture of quenched samples of such a material varies substantially linearly from about 19 MPa when the material is quenched from low temperatures to about 17 MPa when it is quenched from a temperature of about 400° C. The small loss in strength when the material is quenched from higher temperatures is because there has been stable crack propagation, but the mechanical strength at low temperatures has been sacrificed, being only about one tenth of the strength of a dense commercial alumina ceramic material. An even more serious sacrifice has also occurred, for in the case of a porous alumina refractory brick, the rate of slag erosion (corrosion) of the alumina increases exponentially with the increase in porosity.

Another illustration of the problems that can be encountered when dense ceramic materials are subjected to thermal shock is found in ceramic capacitors made from barium titanate ($BaTiO_3$). These capacitors are important components of modern integrated circuit boards, but they are prone to failure as a consequence of thermal shock when metal electrical contacts are soldered onto the capacitors.

All ceramics contain flaws generated during manufacturing and handling which render them prone to failure by unstable crack propagation when they are subject to tensile stresses. In the case of multilayer ceramic oxide capacitors, even if only 0.5 percent of such capacitors fail, as components of integrated circuit boards, the annual economic loss in the USA is about $20,000,000. The topic of reliability of multilayer ceramic capacitors is discussed in detail in the *Journal of the American Ceramic Society*, volume 72, number 12, 1989, pages 2221-2294.

DISCLOSURE OF THE INVENTION

It is an object of the present invention to provide a refractory or ceramic material which is reasonably strong, is thermal shock resistant and is also corrosion resistant (that is, it is a relatively dense material).

This objective is achieved by creating a composite refractory material which has a matrix of alumina within which are dispersed polycrystalline particles of zirconia which have a high degree of thermal expansion anisotropy. Such particles are agglomerates having a diameter of from 10 to 15 micrometers of microcrystals, (each 1 to 2 micrometers in diameter), which are strongly bonded together so that no matrix material is contained within the agglomerate. The dispersed polycrystalline particles may occupy from about 1.0 percent by volume to about 40 percent by volume of the composite refractory, and the porosity of the composite refractory must not exceed 12 percent. The composite material is produced by die pressing a powder mixture, followed by sintering, in the absence of applied pressure, at a temperature of about 1600° C.

Thus, according to the present invention, there is provided an alumina/zirconia composite refractory material comprising an alumina matrix with particles of zirconia dispersed therein, said composite material having a porosity which does not exceed 12 per cent, characterized in that the particles of zirconia (a) occupy from 1.0 percent by volume to 40 percent by volume of the composite refractory material;

(b) each comprise a polycrystalline agglomerate of microcrystals with no matrix material within the agglomerate, the microcrystals (i) being strongly bonded together, (ii) exhibiting a strong thermal expansion anisotropy, and (iii) having a size such that cracks do not form spontaneously within the agglomerate during cooling from a temperature of about 1600° C. to room temperature; and (c) each have a mean diameter of from 10 to 15 micrometers, with the microcrystals therein having a mean diameter in the range of from 1 to 2 micrometers.

(a) a matrix of a refractory material;

(b) particles of a ceramic material dispersed in the matrix, the particles occupying from 1.0 percent by volume to 40 percent by volume of the composite refractory material, each particle comprising a polycrystalline agglomerate of microcrystals with no matrix material within the agglomerate, the microcrystals (i) being strongly bonded together, (ii) exhibiting a strong thermal expansion anisotropy, and (iii) having a size such that cracks do not form spontaneously within the polycrystalline agglomerate during cooling from a temperature of about 1600° C. to room temperature; the ceramic material and the refractory material of the matrix being mutually chemically inert in the temperature range of the use of the composite refractory material.

Those skilled in this field will recognise that there is a superficial similarity between the composite material of the present invention and the material described and claimed by Leon R Schlotzhauer and Kenneth T. Wood in the specification of their U.S. Pat. No. 2,842,447.

Schlotzhauer and Wood sintered a mixture of finely divided particles of zircon ($ZrSiO_4$) and alumina ($Al_2O_3$) in stoichiometric proportions to produce zirconia ($ZrO_2$) and mullite ($Al_6Si_2O_{13}$) according to the reaction

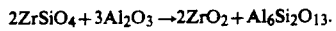

$$2ZrSiO_4 + 3Al_2O_3 \rightarrow 2ZrO_2 + Al_6Si_2O_{13}.$$

The product material, they claimed, "consists essentially of spherically shaped aggregates of crystals of zirconia about 4 to 10 microns in diameter and needle-like crystals of mullite." The zirconia aggregates were stated to be dispersed in a mullite matrix.

A micrograph of the Schlotzhauer and Wood material was included in the paper by F Cambier, C Baudin De La Lastra, P Pilate and A Leriche entitled "Formation of Microstructural Defects in Mullite-Zirconia and Mullite-Alumina-Zirconia Composites", which was published in the *British Ceramics Transactions Journal*, volume 86, 1984, pages 196 to 200. It is clear from that micrograph that the Schlotzhauer and Wood material contains clusters of monocrystals of zirconia, separated from each other by interstitial mullite matrix material, each crystal of zirconia having a mean diameter of about 8 micrometers. In contrast, the agglomerates of the dispersed phase of the composite material of the present invention are truly polycrystalline, comprising strongly bonded microcrystals of zirconia having a mean diameter in the range of from 1 to 2 micrometers, with no matrix (or other) material within the polycrystalline entity or agglomerate, each polycrystalline material having a diameter in the range of from 10 to 15 micrometers.

Those skilled in this field will recognize a superficial similarity between the composite material of the present invention and some of the materials described in U.S. Pat. No. 4,298,385 to Claussen et al. It is apparent, from the reported properties of the materials described by Claussen et al, that those materials have been produced by hot pressing of the powder mixtures used when formulating the materials. The materials of the present invention have different physical properties from those of the materials described by Claussen et al, for the materials of the present invention are produced by die pressing of the powder mixture, followed by pressureless sintering at an elevated temperature of about 1600° C.

The preferred concentration of the polycrystalline agglomerates zirconia in the composite refractory material of the present invention is about 5.6 percent by volume.

The present invention also encompasses a method of making such a composite refractory material, comprising the steps of (a) mixing together a powder of the matrix alumina material, a powder of the polycrystalline ceramic material to be dispersed within the matrix material, and a fugitive binder;

(b) allowing the mixture to dry;

(c) granulating the dried powder mixture;

(d) preforming the granulated powder into billets by die pressing;

(e) isostatically pressing the die pressed billets to form green billets for sintering;

(f) heating the green billets at a predetermined rate until a sintering temperature in the range from 1200° C. to 1800° C. is reached;

(g) holding the green billets at the sintering temperature for a period in the range from 0 to 5 hours; and (h) furnace cooling the sintered billets to ambient temperature.

The smaller the grain size of the matrix material, the lower the sintering temperature. The preferred period of hold at the sintering temperature is about 1 hour.

Examples of composite refractory materials made in accordance with the present invention will now be described with reference to the accompanying drawings.

DETAILED DESCRIPTION OF EMBODIMENTS

The matrix phase of the composite material of the present invention has to have a particle size which is consistent with sintering to a high density at the firing temperature of the refractory material. Thus when oxide ceramics are used as the matrix refractory material, the mean particle size of the matrix material will be in the range from 0.1 to 5.0 micrometers, with a preferred value of about 1.0 micrometers. than these values should be used. The purity of the matrix alumina is preferably such that the material contains an insignificant amount of low melting point glassy phases.

Figure 3:
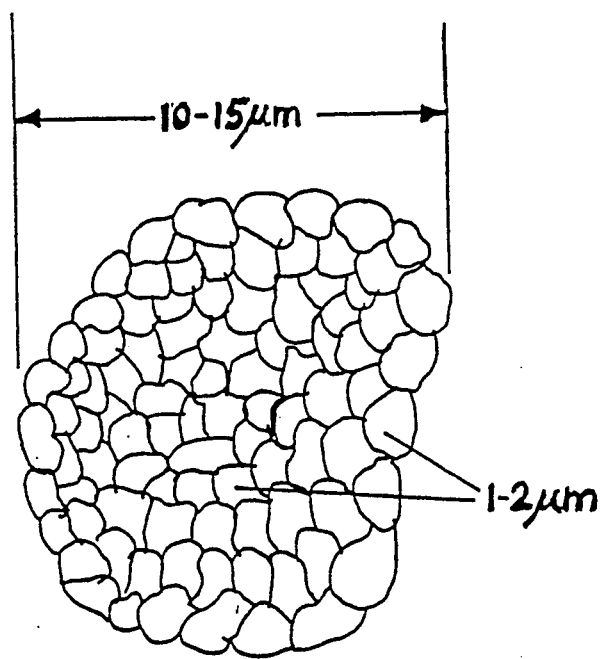
FIG. 3 is a schematic diagram of a monoclinic zirconia polycrystal used in the present invention.

Some samples of a composite alumina refractory material which contained polycrystalline agglomerates of microcrystalline zirconia particles with no matrix material within the agglomerates were produced and the performance of such material was compared with the performance of (a) samples of an alumina material fabricated using the same technique but with no particles of polycrystalline material added, and (b) samples of a similar alumina material containing single crystals of zirconia (also made using the same technique). For the alumina/zirconia compositions containing particles of polycrystalline zirconia, manufactured agglomerates of a commercial product marketed as "MEL-S" (trade mark) zirconia powder by Magnesium Elektron Co. Ltd were used as the dispersed phase of the composite refractory. These commercial polycrystalline particles had a mean particle size of about 13 micrometers; each particle comprised bonded microcrystals having an average diameter in the range from 1 to 2 micrometers. A typical particle is shown schematically in FIG. 3.

For the other alumina/zirconia composition, natural baddelyite was used as the dispersed phase. The mean particle size of the baddelyite single crystals was about 9 micrometers; that is, the size was similar to the agglomerate size of the "MEL-S" powder. The morphology of the polycrystalline "MEL-S" oxide was confirmed to be stable by heating the oxide to 1600° C. (the fabrication temperature of the composite refractory material). No change in the powder was observed with such heating which will lead persons skilled in this field to conclude that the production process for this powder had included a pre-sintered step, to a temperature of at least 1600° C. which will lead persons skilled in this field to conclude.

To make the sample materials, a pure alumina powder (Reynold's RC 172 DBM alumina) was used. The composition of this powder is given in Table 1 below, together with the compositions of the "MEL-S" and baddelyite materials used.

TABLE 1

| Component Oxide | Analyses of the Oxide Powders | | |
|---|---|---|---|
| | RC-172 DBM | MEL-S | BADDELYITE |
| $Al_2O_3$ | 99.7 | 0.30 | 0.20 |
| $Na_2O$ | 0.060 | — | 0.10 |
| $SiO_2$ | 0.080 | 0.30 | 0.50 |
| $Fe_2O_3$ | 0.030 | 0.10 | 0.20 |
| MgO | 0.056 | — | 0.20 |
| $TiO_2$ | — | 0.20 | 0.18 |

Impurities in the alumina are tolerated. However, if the product composite refractory material is to be used in contact with slags or molten glass (in which cases, corrosion could be expected), there should be no significant amount of low melting point glassy phases, or phases which react with the zirconia particles, in the alumina.

The sample materials were made, with various zirconia contents, using the following steps:
a) the alumina and zirconia powders were mixed together with a fugitive binder in an inert liquid medium (water, in this instance);
b) the mixture of powders was dried by evaporation of the liquid medium at room temperature;
c) the dried powder mixture was granulated by passing it through a 20-mesh (B.S.S.) screen, then through a 50-mesh (B.S.S.) screen;
d) the granulated powder was preformed, by die pressing, into billets;
e) the billets were isostatically pressed at a pressure of about 210 MPa;
f) the green pressed billets were heated to a temperature of 1600° C. at a rate of 100° C. per hour;
g) the heated billets were held at the sintering temperature of 1600° C. for one hour without the application of external pressure (that is, without recourse to hot pressing);
h) the sintered billets were furnace cooled to ambient temperature.

Steps (f) and (g) may be modified according to the composition of the composite refractory material being produced and the ability of the furnace to heat up at a predetermined rate. In general, the larger the size of the grains of the matrix material, the higher the sintering temperature. Matrix materials having a sub-micron grain size can be sintered at a temperature as low as 1200° C. Normally, 1800° C. will be the maximum sintering temperature. Similarly, the hold period at the sintering temperature may be varied, with 5 hours being the maximum hold time if coarse grained matrix material is used. If fine grained matrix material is used, satisfactory product material is achieved simply by heating to the sintering temperature, then switching the furnace off.

To provide test samples of the materials, the billets were ground until they had dimensions 3 mm×3 mm×40 mm. Samples from each batch of billets were then given a thermal shock resistance test by heating the billets to 1000° C. and quenching the heated billets in water to room temperature. The percentage of the original strength (modulus of rupture) which was retained by the quenched sample was then measured. The results of this testing are presented in graphical form in FIG. 1.

Figure 1:
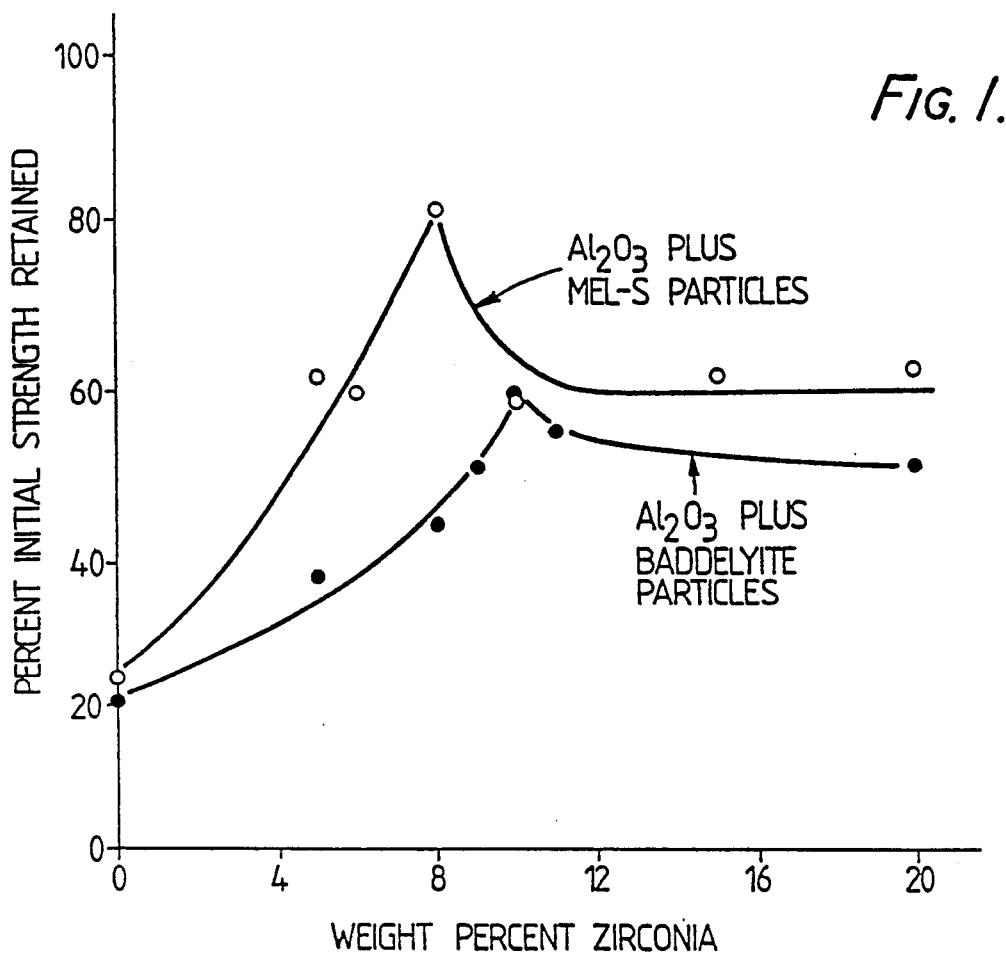
FIG. 1 is a graph showing the variation of the thermal shock resistance of samples of alumina and of alumina based composite refractory materials as the amount of particulate agglomerate zirconia dispersed therein is varied.

As will be seen from FIG. 1, the composite refractory materials which retained most of their original strength were those containing 8 percent (by weight) of the "MEL-S" material and 10 percent (by weight) of the baddelyite powder. Values of 8 per cent by weight and 10 percent by weight correspond to 4 percent by volume and 5 percent by volume, respectively. The batches of material containing these amounts of zirconia were designated AS8 and AB10, respectively. It is interesting to note that the AS8 material retained 84.6 percent of its original strength, whereas the AB10 material retained 63.0 percent of its original strength - a significantly lower percentage. The AS8 material had a porosity of 4.0 percent.

It will also be seen from FIG. 1 that good retention of original strength is exhibited by the samples containing from about 6 percent by weight (3 percent by volume) to 20 percent by weight (10 percent by volume) of the "MEL-S" zirconia dispersed phase.

More detailed thermal shock testing was then carried out using sample billets of the AS8, AB10 and alumina materials. The variation of the retained strength of these materials as the quenching temperature difference increases is shown in FIG. 2.

Figure 2:
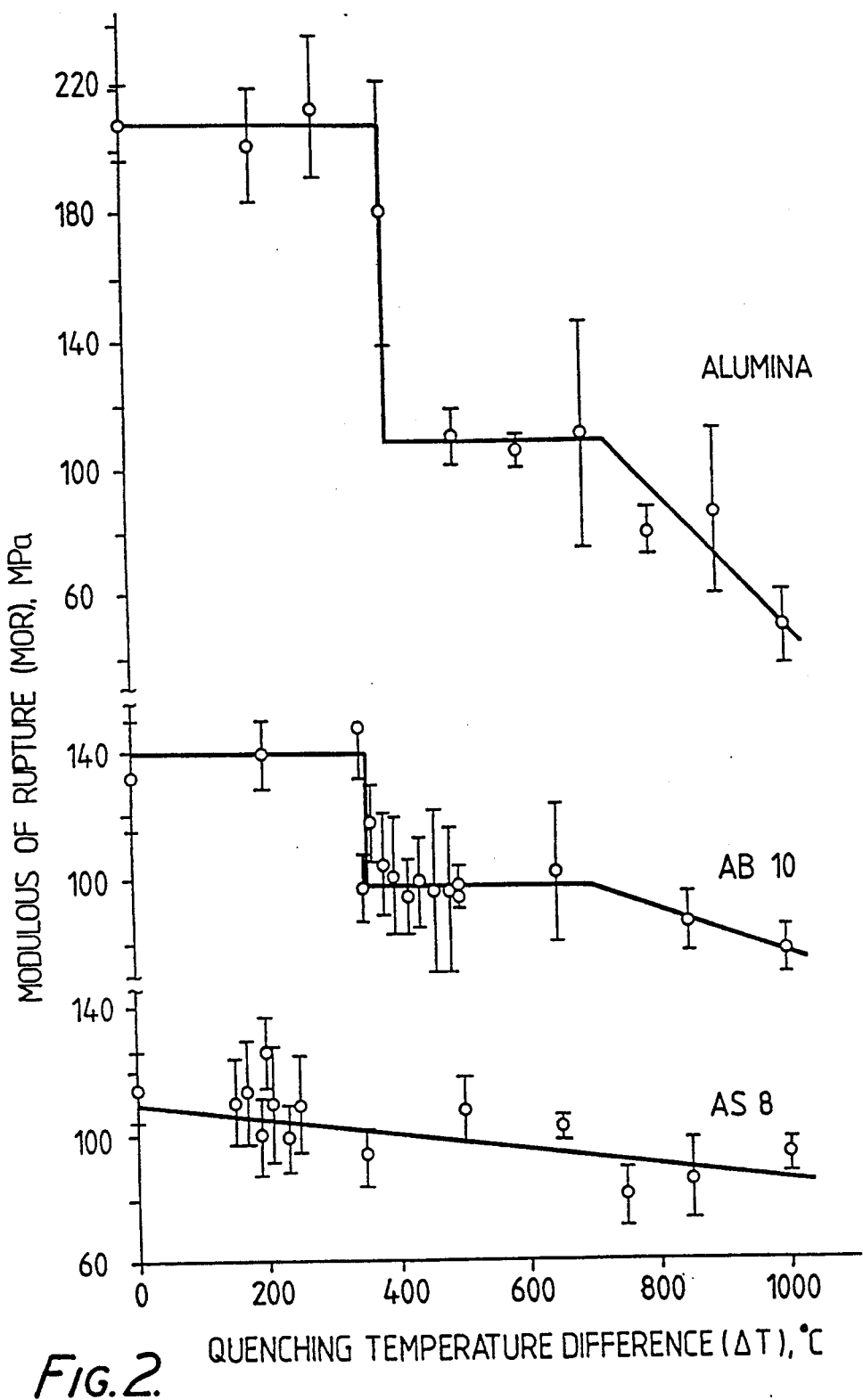
FIG. 2 is a graph showing thermal shock data for three materials.

As will be seen from FIG. 2, the alumina samples had the typical thermal shock behaviour of dense ceramic materials, namely the sudden drop in retained strength occurring with a quenching temperature difference of 400° C. The AB10 material performed in a similar manner, except that the decrease in strength at 400° C. was less than the decrease in strength at this temperature exhibited by the alumina samples. The behaviour of the AS8 material indicates that only stable crack propagation occurs with this material. Note, however, that its retained modulus of rupture is quite high, being close to 115 MPa at low quenching temperature differences (compared with about 19 MPa for a typical alumina refractory brick).

Experiments in which samples of AS8 were annealed at 1100° C. for four hours to remove any residual transformational strains which could generate a toughening mechanism showed that the zirconia particles are still monoclinic at this temperature. Thermal shock testing of these annealed samples showed that the transformation from tetragonal zirconia to monoclinic zirconia is only partly, and in a minor way, involved in the enhanced thermal shock resistance of the AS8 material. The present inventor believes (this has yet to be confirmed) that the properties of the AS8 material are due, in part, to the combination of the particle morphology (the agglomerates of pre-sintered microcrystals with no interstitial material within the agglomerates) and the severe thermal expansion anisotropy of the monoclinic structure of the zirconia particles. The highly strained agglomerates interact with the thermal stresses generated during the thermal shock, thereby creating a localised dense network of microcracks. Such microcracking can only occur when the agglomerates are firmly embedded within the matrix material. Hitherto, this has only been achieved by Claussen et al in the materials described in U.S. Pat. No. 4,298,385, by the relatively expensive process of hot pressing of the powder mixtures during their sintering. Such networks would constitute a toughening mechanism which results in stable crack propagation in dense materials.

This explanation is in accordance with the general understanding that the difference in the behaviour of ceramics and refractories is due to crack propagation differences in these materials. When a ceramic material is subjected to thermal shock and a crack is initiated, it propagates catastrophically (unstably) through the material because the energy to drive a crack through the ceramic material is close to the energy required to initiate the crack. In a refractory material, considerably more energy is required to drive a crack through the material than is needed to create the crack. Thus, when a porous refractory is subjected to thermal shock, many cracks are initiated but none is propagated over any harmful distance, so the material survives the thermal shock with little change in its strength.

It will be appreciated that the mullite/zirconia materials of Schlotzhauer and Wood, discussed earlier in this specification, cannot function in the manner indicated by this explanation of the present invention because the morphology of the Schlotzhauer and Wood material is so different from that of the material of the present invention. In particular, the Schlotzhauer and Wood material contains no highly strained polycrystalline agglomerates which can interact with the thermal stresses generated by the thermal shock, to create a localised dense network of microcracks.

Those skilled in this art will recognise that the material AS8 is a dense ceramic material that behaves in the manner of a porous refractory brick. However, it is believed that AS8 is but one representative member of a new class of composite refractory materials which are dense, thermally shock resistant and reasonably strong. Other members of this class will include:

a) mullite with particles of polycrystalline zirconia distributed therein (particularly useful for foundry crucibles, furnace tubes, heat exchangers and kiln furniture);

b) barium titanate with polycrystalline zirconia particles distributed therein (very useful, as noted above, for ceramic oxide capacitors);

c) silicon nitride with polycrystalline particles of boron nitride agglomerates distributed therein (particularly useful for components for internal combustion engines, including piston caps, cylinder liners and valves);

d) silicon carbide with polycrystalline particles of silicon carbide with polycrystal boron nitride agglomerates distributed therein (useful for the manufacture of kiln furniture);

e) alumina with polycrystalline particles of aluminium titanate distributed therein (especially useful for components for handling molten metals);

f) magnesia with polycrystalline particles of magnesium titanate distributed therein (also useful for components for handling molten metals);

g) spinel with polycrystalline particles of zirconia distributed therein (another material useful for the manufacture of components for handling molten metals); and h) fosterite with polycrystalline particles of zirconia distributed therein (yet another material useful for components for handling molten metals).

This list is not exhaustive.

In the case of barium titanate with zirconia particles dispersed therein, the present inventor has found that using a fine powder of pure barium titanate and the same "MEL-S" monoclinic zirconia polycrystals as those used for the alumina/zirconia composite material described in detail above, it is possible to produce thermally shock resistant, dense barium titanate multilayer capacitor materials if the zirconia polycrystalline particles comprise from 4 to 30 percent (by weight) of the solid oxide powder material. The preferred concentration of the dispersed zirconia phase is about 10 weight percent. Tapecasting techniques are used to form the "green" multilayer material. The green "sandwich" material is fired at about 1350° C. for the minimum time required to achieve a dense ceramic body.

The composite refractory material comprising alumina with zirconia agglomerates distributed therein is particularly useful for the manufacture of pouring nozzles and sliding gates for the continuous casting of steel. Another use for this material is the monolith support for catalytic converters of the type now required to be fitted to the engines of all new petrol-powered automobiles in Australia. At present, this monolith support is made like a refractory brick, with up to 40 percent open porosity. Using the composite refractory material of the present invention, the cell walls of the honeycomb can be made strong and thin, with only surface porosity to absorb the catalyst wash coat. This type of structure enables more cells per square centimeter to be created and reduces the back pressure on the engine, thus creating a more efficiently powered vehicle.

I claim:

1. A composite alumina/zirconia refractory material comprising an alumina matrix with particles of zirconia dispersed therein, said composite material having been formed by die pressing a mixture of alumina powder and the zirconia particles, followed by sintering in the absence of applied pressure at a temperature of about 1600° C., said composite material having a porosity which does not exceed 12 percent, wherein the particles of zirconia (a) occupy from 1.0 percent by volume to 40 percent by volume of the composite refractory material;

(b) each comprise a polycrystalline agglomerate of microcrystals with no matrix material within the agglomerate, the microcrystals (i) being strongly bonded together, (ii) exhibiting a strong thermal expansion anisotropy, and (iii) having a size such that cracks do not form spontaneously within the agglomerate during cooling from a temperature of about 1600° C. to room temperature; and (c) each have a mean diameter of from 10 to 15 micrometers, with the microcrystals therein having a mean diameter of from 1 to 2 micrometers.

2. A composite refractory material as defined in claim 1, in which the dispersed zirconia particles comprise from 3 per cent to 10 percent by volume of the composite refractory material.

3. A composite refractory material as defined in claim 1, in which the dispersed zirconia particles comprise about 5.6 percent by volume of the composite refractory material.

4. A composite refractory material as defined in claim 1, in which the alumina matrix phase has a mean particle size in the range from 0.1 micrometer to 5.0 micrometers.

5. A composite refractory material as defined in claim 4, in which the alumina matrix phase has a mean particle size of about 1.0 micrometer.

6. A composite refractory material as defined in claim 1, in which the alumina matrix material contains an insignificant amount of low melting point glassy phases.

7. A composite refractory material as defined in claim 2, in which the dispersed polycrystalline zirconia particles comprise about 10 percent by volume of the composite material.

8. A method of making a composite refractory material as defined in claim 1, said method comprising the steps of (a) mixing together a powder of the alumina material, a powder of the polycrystalline to be dispersed within the matrix material, and a fugitive binder;

(b) allowing the mixture to dry;

(c) granulating the dried powder mixture;

(d) preforming the granulated powder into billets by die pressing;

(e) isostatically pressing the die pressed billets to form green billets for sintering;

(f) heating the green billets at a rate until a sintering temperature of from 1200° C. to 1800° C. is reached;

(g) holding the green billets at the sintering temperature for a period of from 0 to 5 hours; and (h) furnace cooling the sintered billets to ambient temperature.

9. A method as defined in claim 8, in which the period of hold at the sintering temperature is about 1 hour.

10. A method as defined in claim 3, in which the heating rate is 100° C. per hour, the sintering temperature is 1600° C., and the period of hold at the sintering temperature is one hour.

* * * * *